(12) United States Patent
Gallati

(10) Patent No.: US 9,811,293 B2
(45) Date of Patent: Nov. 7, 2017

(54) METHOD AND PRODUCTION APPARATUS FOR PRODUCING PERSONALIZED PRINTED END PRODUCTS

(71) Applicant: Rudolf Gallati, Neuhaus (CH)

(72) Inventor: Rudolf Gallati, Neuhaus (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 15/053,612

(22) Filed: Feb. 25, 2016

(65) Prior Publication Data

US 2016/0259603 A1    Sep. 8, 2016

(30) Foreign Application Priority Data

Mar. 2, 2015 (CH) ........................ 0276/15

(51) Int. Cl.
*B41F 13/46* (2006.01)
*G06F 3/12* (2006.01)
(Continued)

(52) U.S. Cl.
CPC ............ *G06F 3/1234* (2013.01); *B41F 13/46* (2013.01); *B41F 33/0009* (2013.01); *B42C 1/10* (2013.01); *B65H 39/02* (2013.01); *G06F 3/12* (2013.01); *G06F 3/121* (2013.01); *G06F 3/1208* (2013.01); *G06F 3/1246* (2013.01);
(Continued)

(58) Field of Classification Search
CPC ........ G07F 17/26; H04N 5/272; H04N 7/188; H04N 21/4147; H04N 21/44222; H04N 21/4532; H04N 21/4622; H04N 21/4755; H04N 21/482; H04N 5/44543;
(Continued)

(56) References Cited

U.S. PATENT DOCUMENTS 5,966,503 A * 10/1999 van Vliembergen . G06F 3/1297
358/1.18
5,993,048 A * 11/1999 Banks ..................... G07F 17/26
700/233
(Continued)

FOREIGN PATENT DOCUMENTS

DE          103 00 071 A1    7/2004
DE    10 2005 019 533 A1   11/2006
(Continued)

*Primary Examiner* — Negussie Worku
(74) *Attorney, Agent, or Firm* — Pauley Erickson & Kottis

(57) ABSTRACT

The invention relates to producing personalized printed end products which have in each case a printed product collection and at least one personalized printed product by creating (S1) end product specifications which define in each case at least one personalized printed end product, creating (S2) sales orders on the basis of end product specifications, wherein a sales order defines at least one sequence of printed product collections, initiating (S3) the process of creating and creating (S4) digital print orders on the basis of end product specifications and sales orders, wherein a digital print order defines at least one personalized printed product, producing (S5) printed product collections in accordance with the sales orders, producing (S6) personalized printed products in accordance with the digital print orders, and producing (S7) personalized printed end products from the produced printed product collections and personalized printed products.

20 Claims, 2 Drawing Sheets

(51) Int. Cl.
*B41F 33/00* (2006.01)
*B42C 1/10* (2006.01)
*B65H 39/02* (2006.01)

(52) U.S. Cl.
CPC ........ *G06F 3/1264* (2013.01); *B42P 2261/04* (2013.01); *B65H 2301/437* (2013.01); *B65H 2301/4311* (2013.01); *B65H 2301/4312* (2013.01)

(58) Field of Classification Search
CPC ........ B41F 13/46; B41F 33/0009; B42C 1/10; B42P 2261/04
USPC .... 358/1.15, 1.12, 1.16, 1.18; 386/223, 239, 386/314, 278, 341
See application file for complete search history.

(56) References Cited

U.S. PATENT DOCUMENTS

| | | | | |
|---|---|---|---|---|
| 7,286,250 B2* | 10/2007 | Kujirai | ................ | G06F 3/1222 358/1.15 |
| 7,346,668 B2* | 3/2008 | Willis | ................ | G06F 17/30867 707/999.003 |
| 7,370,276 B2* | 5/2008 | Willis | ................ | G06F 17/30702 707/E17.06 |
| 7,639,386 B1* | 12/2009 | Siegel | ................ | G06Q 40/025 358/1.18 |
| 8,045,202 B2* | 10/2011 | Shirai | ................ | G06F 3/1204 358/1.15 |
| 8,619,303 B2* | 12/2013 | Miura | ................ | B41J 2/175 347/14 |
| 8,910,055 B2* | 12/2014 | Berger | ................ | G06Q 30/01 715/751 |
| 8,928,912 B2* | 1/2015 | Misawa | ................ | G06F 3/1212 358/1.15 |
| 9,132,691 B2* | 9/2015 | Hirsch | ................ | B42D 15/027 |
| 2005/0044476 A1 | 2/2005 | Bursten | | |
| 2006/0150848 A1* | 7/2006 | Deutsch | ................ | B41F 17/02 101/483 |
| 2006/0232831 A1* | 10/2006 | Chiba | ................ | H04N 1/0048 358/448 |
| 2006/0238777 A1* | 10/2006 | Anno | ................ | H04N 1/00127 358/1.1 |
| 2009/0202134 A1* | 8/2009 | Kano | ................ | G06K 9/2054 382/141 |
| 2011/0301746 A1* | 12/2011 | Gallati | ................ | B65G 43/10 700/229 |
| 2013/0063774 A1* | 3/2013 | Nuggehalli | ................ | G06F 3/1207 358/1.15 |
| 2013/0063781 A1* | 3/2013 | Gustafson | ................ | G06Q 10/06 358/1.15 |
| 2014/0156468 A1* | 6/2014 | Tamagawa | ................ | G06Q 30/0635 705/26.81 |
| 2016/0236897 A1* | 8/2016 | Gallati | ................ | B65H 29/003 |
| 2016/0257522 A1* | 9/2016 | Keller | ................ | B65H 39/115 |

FOREIGN PATENT DOCUMENTS

| | | |
|---|---|---|
| EP | 1 911 583 A1 | 4/2008 |
| EP | 2 433 808 A1 | 3/2012 |
| WO | WO 96/23665 | 8/1996 |
| WO | WO 98/03347 | 1/1998 |

\* cited by examiner

METHOD AND PRODUCTION APPARATUS FOR PRODUCING PERSONALIZED PRINTED END PRODUCTS

CROSS-REFERENCE TO RELATED APPLICATION

Swiss Patent Application 00276/15, filed 2 Mar. 2015, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The invention relates to a method for producing personalized printed end products. The invention additionally relates to a production apparatus for producing personalized printed end products.

Discussion of Related Art

"Print on demand" denotes the production of printed products in a manner conforming to demand. The printed products are often produced on digital printing machines, wherein the printed products can have customized features, such as e.g. personalized QR code and URL (QR: Quick Response, URL: Unified Resource Locator). "Print on demand" is employed in the production of single copies, very short runs of, for example, up to ten copies, short runs of, for example, up to a hundred copies, or in medium-size runs of up to a few hundred thousand copies. For producing very large runs with, for example, millions of copies, "Print on demand" is generally still too expensive.

It is known from the prior art, for producing personalized printed end products, for a printed product produced cost-effectively in a high-capacity method, such as rotary printing, to be provided with a personalized printed product produced, for example, by a digital printing machine.

US 2005/0044476 discloses arranging customized content in a brochure. A content identification serves for personalizing the brochure and is read in from a preprinted brochure part and sent to a content control device. The content control device uses the content identification to obtain instructions from a data memory that serve for creating one or a plurality of freshly printed brochure parts. The freshly printed brochure parts are joined to a preprinted brochure in order to create a customized brochure.

EP 1 911 583 discloses the production of an individualized printed product. A main product or partial product is produced in a high-capacity printing process, such as rotary printing, and is provided with an identification means. The identification means carries the information for identifying the product. The identification means enables the assignment of at least two further downstream individualization steps, such as the addition of information to the respective product. An addressee-specific digital printed product can comprise a blog insert. The identification means can comprise control information which directly controls the processing of the respective product by a processing device.

WO 98/03347 discloses feeding starting products and/or intermediate products as product streams to processing steps and discharging processed objects as streams of end products. In the fed and discharged product streams, individual products or product groups are conveyed successively in a sequence. A property of a processed product or of a processed product group is changed in processing steps. Sequence conversions by transferring products in, by transferring products out or by a combination thereof make it possible to change the sequence of the products or product groups. As a result, the processing steps can be interlinked to any degree of complexity, there nevertheless being high flexibility. Sequence conversions and processing steps are controlled in accordance with properties of the fed products or product groups and/or in accordance with a predefined sequence to be created.

The prior art still does not make it possible to achieve high capacities in the production of personalized printed end products at marketable prices. In order to produce large runs, the prior art discloses methods which either are very expensive or enable only a low degree of personalization. The methods known in the prior art are not robust in relation to malfunctions and the indications about the printed end products actually produced are not very reliable.

SUMMARY OF THE INVENTION

It is an object of the invention to avoid at least certain problems in the prior art or to offer a solution thereto.

This object is achieved by means of the method defined in independent Patent claim 1.

The automated method according to the invention for producing personalized printed end products which have in each case a printed product collection and at least one personalized printed product comprises: creating end product specifications which define in each case at least one personalized printed end product; creating sales orders on the basis of end product specifications, wherein a sales order defines at least one sequence of printed product collections; initiating the process of creating and creating digital print orders on the basis of end product specifications and sales orders, wherein a digital print order defines at least one personalized printed product; producing printed product collections in accordance with the sales orders; producing personalized printed products in accordance with the digital print orders; and producing personalized printed end products from the produced printed product collections and personalized printed products. The end product specifications define the personalized printed end product which is producible efficiently and cost-effectively in a large run by virtue of the decoupling of creating sales orders and creating digital print orders.

In one embodiment, the process of producing personalized printed products is initiated temporally before the process of producing the printed product collections.

In one embodiment, produced personalized printed products are temporarily stored in an intermediate store.

In one embodiment, during the process of producing printed product collections, fault monitoring is performed and faulty printed product collections are repaired or discarded and produced subsequently.

In one embodiment, an associated personalized printed product is produced subsequently with respect to a repaired or subsequently produced printed product collection.

In one embodiment, during the process of producing a personalized printed end product, quality control is performed and an associated quality identification is attached to the personalized printed end product.

In one embodiment, a check code is assigned to the personalized printed end product, said check code being attached to the personalized printed end product.

In one embodiment, the creation of sales orders comprises an optimization which optimizes an occupancy of feed devices of an apparatus for producing the personalized printed end products.

In one embodiment, the creation of sales orders comprises an optimization which optimizes at least one delivery route of the personalized printed end products.

In one embodiment, at least one end product specification is provided in the form of an XML document.

In one embodiment, at least one end product specification is provided in the form of a URL.

In one embodiment, a personalized printed end product is produced in such a way that it enables an addressee assigned to the personalized printed end product to influence the process of creating an end product specification. The addressee is enabled, in particular, to influence the process of creating the end product specifications of said addressee.

In one embodiment, a personalized printed end product is produced in such a way that it comprises a jacket product which jackets the printed product collection and the personalized printed product.

In one embodiment, a personalized printed end product is produced in such a way that the personalized printed product is a cover which encloses the printed product collection.

In one embodiment, a personalized printed end product is produced in such a way that the personalized printed end product has a printed product collection and a personalized printed product which are adhesively bonded to one another. The printed product collection and the personalized printed product are adhesively bonded to one another in particular releasably, wherein the adhesive bonding is embodied in such a way that it can be released without damaging the products.

In one embodiment, personalized printed end products are arranged in packs, taking account of delivery routes.

The invention furthermore relates to a production apparatus for producing personalized printed end products, comprising: a control center designed for the following steps: creating end product specifications which define in each case at least one personalized printed end product, creating sales orders on the basis of end product specifications, wherein a sales order defines at least one sequence of printed product collections, and initiating the process of creating and creating digital print orders on the basis of end product specifications and sales orders, wherein a digital print order defines at least one personalized printed product; wherein a conveying device having a plurality of feeders, a digital printing machine and, if appropriate, an inserting apparatus are provided and the control center is furthermore designed for the control of the following production steps: producing, using the conveying device and the plurality of feeders, printed product collections in accordance with the sales orders, producing, using the digital printing machine, personalized printed products in accordance with the digital print orders, and producing, using the conveying device or the inserting apparatus, personalized printed end products from the produced printed product collections and personalized printed products.

BRIEF DESCRIPTION OF THE DRAWINGS

The invention is explained below with reference to figures which only illustrate exemplary embodiments. In the figures.

DESCRIPTION OF PREFERRED EMBODIMENTS

Figure 1:
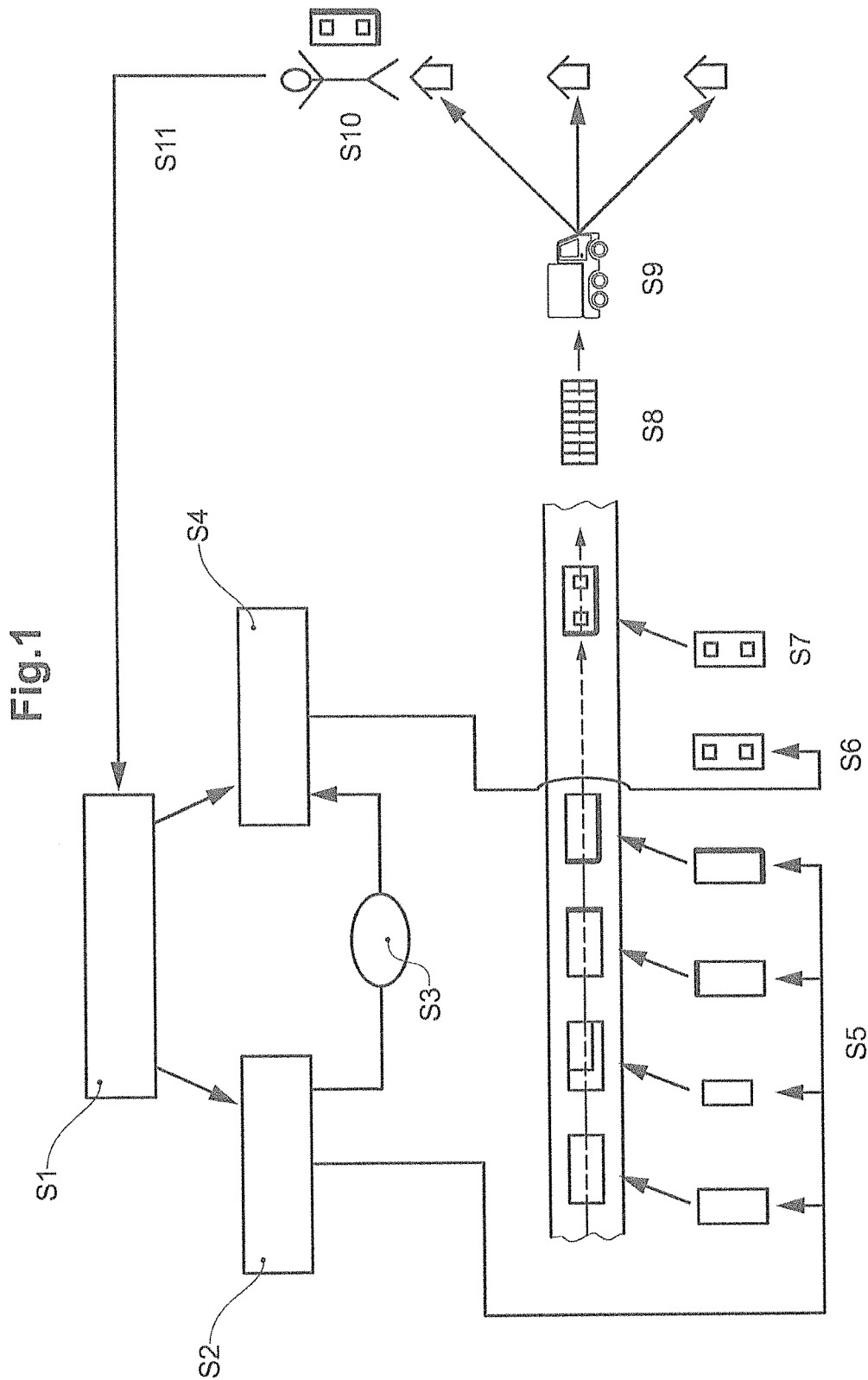
FIG. 1 shows a block diagram of one embodiment variant of the method according to the invention for creating personalized printed end products.

FIG. 1 shows a block diagram of one embodiment variant of the method according to the invention for producing personalized printed end products. Step S1 involves creating a multiplicity of end product specifications. The end product specifications are created, for example, by a computerized control system of a printing further processing installation. Each end product specification defines at least one addressee-specifically personalized printed end product. An end product specification can define a plurality of identical personalized printed end products which are assigned to a group of persons, for example. A personalized printed end product comprises one or a plurality of printed products and at least one personalized printed product. The one or the plurality of printed products can be present in a printed product collection. The personalized printed product is assigned to a person, or respectively an addressee, or a group of persons. Printed product collections can be produced from printed products such as periodicals, magazines, advertising brochures, catalogues, flyers, cards, but also other planar products such as CDs, DVDs, trade samples, coupons, books of coupons and the like. Printed products are available in cost-effective form and preferably originate from a high-capacity printing process such as a rotary printing process, for example. The at least one personalized printed product can be produced on a digital printing machine, a web-fed printing machine, a sheet-fed printing machine, etc.

The end product specifications are created on the basis of orders for creating personalized printed end products, wherein additional information can be taken into account such as information about the abovementioned printed products, master data, rules, addresses, demographic data, advertising orders, geographical data, climatic data, data from news agencies, etc. For creating the end product specifications, the computerized control system comprises routines, algorithms, databases, etc. in order to suitably evaluate selectable information. On the basis of an order for creating personalized printed end products, an end product specification can define, for example, a personalized printed end product which is intended for a recipient and which has a printed product collection comprising a fishing periodical and a fishing regional insert of a fishing club, and a personalized printed product in the form of a personalized fishing advertising brochure of a local fishing shop that is addressed to a recipient. The personalized fishing advertising brochure can comprise, for example, a coupon that is personalized for the recipient.

Information about printed products comprises, for example, indications about the type, number, etc. of printed products which a printed product collection of a personalized printed end product is intended to have. The information about printed products can comprise indications regarding which customer is intended to receive which printed products. The information about printed products can comprise indications regarding which printed products are provided for which delivery route.

Information about master data comprises, for example, indications about clients, order history, order statistics, etc. which are to be taken into account in the production of personalized printed end products.

Information about rules comprises, for example, rules for evaluating master data which are to be taken into account in the production of personalized printed end products. The information about rules can comprise indications about the assignment between printed products or printed product collections and personalized printed products. The information about rules can comprise indications regarding which steps are provided for monitoring the production of personalized printed end products. The information about rules can comprise indications regarding which steps are to be performed if faults, gaps, etc. arise during the production of personalized printed end products.

Information about addresses comprises, for example, country, region, town, district, quarter, street, nearby shopping centers, nearby POIs (POI: Point of Interest), etc. of one or a plurality of recipients of personalized printed end products.

Information about demographic data comprises, for example, statistical indications about groups of persons concerning age, education, residential structure (tenants, owners), population density, career, income, interests, wants, pets, etc.

Information about advertising orders comprises, for example, images, texts, discounts, etc. of a product. Information about advertising orders can comprise indications regarding in which area, for which customer stratum, etc. an advertising order is provided.

Information about geographical data comprises, for example, indications about cities, villages, seas, rivers, course of the border of countries, etc.

Information about climatic data comprises, for example, past and/or forecast weather data. Information about climatic data can be linked to information about advertising orders.

Information about data from news agencies comprises, for example, international news, national news, regional news, business news, sports results, etc. Information about data from news agencies can be linked to information about advertising orders.

The information mentioned can be interlinked. By way of example, information about addresses can be linked to information about demographic data. A wide variety of linkages can be employed.

The end product specifications can be created in the form of structured data such as, for example, in the form of one or a plurality of XML documents (XML: eXtended Markup Language). The end product specifications can be created in the form of access information such as in the form of URL (URL: Unified Resource Locator), the actual end product specification being stored under the URL address. An individual XML document can be provided for each end product specification. An individual URL can be provided for each end product specification. A plurality of end product specifications can be assigned to an individual XML document. A plurality of end product specifications can be assigned to an individual URL.

Step S2 involves creating one or a plurality of sales orders on the basis of the end product specifications. The sales orders define at least one sequence of printed end products which is to be produced and sold. The sequence of printed end products gives rise to a number of printed end products to be produced and sold. The sales orders can correspond to the abovementioned orders for creating personalized printed end products.

The creation of the sales orders can comprise an optimization step in order to configure a sequence during the process of producing personalized printed end products in such a way that the capacity of an apparatus for producing personalized printed end products is optimally utilized.

The creation of the sales orders can comprise an optimization step in order to produce the personalized printed end products in accordance with a sequential order or sequence which is coordinated with desired delivery routes. Step S3 involves initiating the creation of one or a plurality of digital print orders on the basis of the end product specifications and the created sales orders.

Step S4 involves creating digital print orders on the basis of step S3. A digital print order defines at least one personalized printed product which is to be produced and added to at least one printed product collection in order to obtain a personalized printed end product.

Step S5 involves activating a collecting apparatus, wherein a plurality of printed products are collected in accordance with the sales orders and printed product collections are produced therefrom.

Step S6 involves activating a digital printing machine, wherein a plurality of personalized printed products are produced in accordance with the digital print orders.

Step S7 involves collating personalized printed products and the associated printed product collections and producing personalized printed end products therefrom.

Step S8 involves combining personalized printed end products and producing dispatch packs therefrom, wherein a dispatch pack can have one or more of the following features: cording, a film enclosing the dispatch pack, an inscription, a cover sheet, a label.

Step S9 involves loading the dispatch packs on delivery vans and transporting the dispatch packs to delivery points on delivery routes.

Step S10 involves removing personalized printed end products from the dispatch packs and delivering them to the relevant recipient. A recipient can comprise a person or a group of persons.

In step S11, the recipient of a personalized printed end product, in particular using optically readable data, such as a QR code or a URL, attached to the personalized printed end product, accesses a computerized control system in order to influence the process of creating an end product specification. In one variant, the URL is assigned to an end product specification and is employed in the production of personalized printed end products. The recipient thus has the possibility, right up to the production of the relevant personalized printed end product, of influencing the latter in order, for example, to replace printed products of the personalized printed end product that are no longer desired by newly desired printed products.

Figure 2:
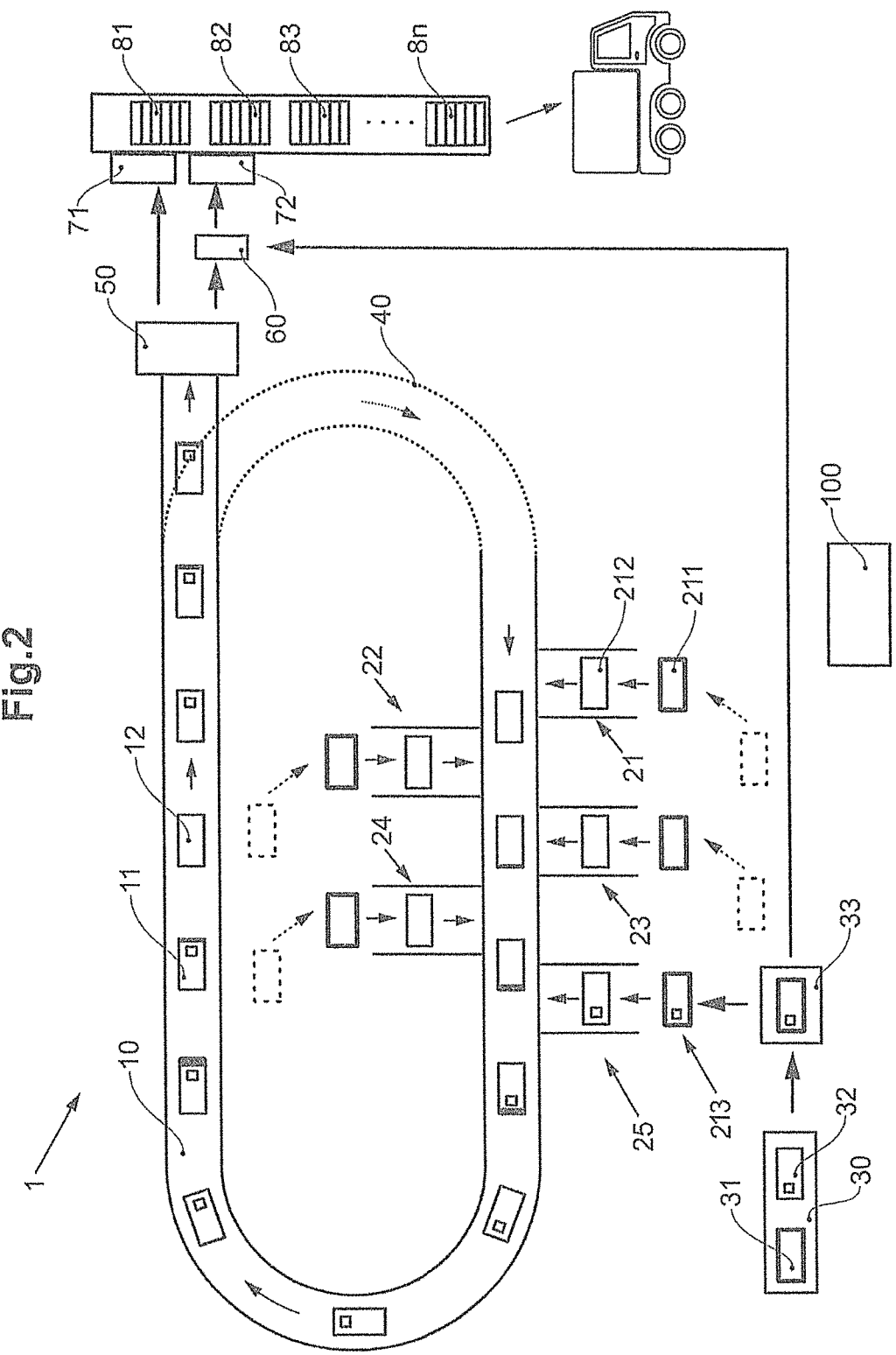
FIG. 2 schematically shows a printing further processing installation for carrying out the method according to the invention for creating personalized printed end products in accordance with one embodiment.

FIG. 2 schematically shows a production apparatus 1 according to the invention for producing personalized printed end products. The production apparatus 1 is assigned a control center 100, which is embodied in particular as a computerized control center and is designed to control the functions of the production apparatus 1. Software programs are provided for this purpose. Furthermore, control connections are provided for transmitting control signals to parts of the production installation 1 and for controlling said parts.

The production apparatus 1 comprises a conveying device 10. The conveying device 10 is embodied in such a way that individual printed products and also printed product collections, personalized printed end products, etc. can be conveyed. The conveying device 10 can operate cyclically and can be designed for a high throughput, such as tens of thousands per hour, for example.

A plurality of feeders 21, 22, 23, 24, 25 are arranged along a partial section of the conveying device 10. The feeders 21, 22, 23, 24, 25 are designed to feed printed products to the conveying device 10.

The plurality of feeders 21, 22, 23, 24, 25 are in each case equipped at least similarly or identically. For the feeder bearing reference sign 21, FIG. 2 shows features which will be described below and are provided similarly or identically for the further feeders 22, 23, 24, 25.

As illustrated for the feeder bearing reference sign 21, a stack 211 is provided, having printed products stacked one on top of another. As is illustrated schematically by dashed lines in FIG. 2, the stack 211 is subsequently filled with respectively identical printed products or replaced by other printed products in the course of the production of personalized printed end products. As illustrated for the feeder bearing reference sign 21, a printed product 212 from the stack 211 is fed to the conveying device 10.

As a result of the feeding of printed products to the conveying device 10, which is carried out cyclically, in particular, printed product collections are formed on the conveying device 10.

In order to form a personalized printed end product, the printed product collections can optionally be provided with a personalized printed product. Production is effected on the basis of printed end product specifications. Production is controlled by the control center 100.

As illustrated schematically in FIG. 2, a digital printing machine 30 is provided for producing personalized printed products. The digital printing machine 30 has a stack comprising unprinted printed products 31. The digital printing machine 30 is designed to print an unprinted printed product 31 and to produce a personalized printed product 32. Production is effected on the basis of printed end product specifications. Production is controlled by the control center 100.

During the process of producing the personalized printed products 32, placeholders which define an available space on the unprinted printed product 31 are printed with personalized content. The unprinted printed product 31 can have three placeholders, for example. During the process of producing a first personalized printed product, a first placeholder is printed with information concerning a product A, a second placeholder is printed with information concerning a product B and a third placeholder is printed with information concerning a product C. During the process of producing a second personalized printed product, for example, the first placeholder is printed with information concerning a product D, the second placeholder is printed with information concerning the product B and the third placeholder is printed with information concerning the product A. The personalized printed products 32 are produced on the basis of printed end product specifications. Production is controlled by the control center.

The personalized printed product 32 can be provided with a check code which is created on the basis of the printed end product specification. The check code can serve to carry out a check of the printed end products actually produced in later processing steps. The check code can contain indications about the printed end product, such as, for example, from which printed products the relevant printed product collection is collated and how the personalized printed end product is configured. The check code makes it possible to track whether the personalized printed end product was produced correctly, whether it was produced in the correct sequence, whether it is situated in the correct pack for delivery, etc. Reliable information about the personalized printed end products produced is yielded as a result.

The personalized printed product 32 can be fed to the conveying device 10 directly after printing and can be added to a printed product collection in order to form a personalized printed end product.

The personalized printed product 32 can be temporarily stored in an intermediate store 33. The temporary storage makes it possible to decouple speed fluctuations of the digital printing machine 30 and of the conveying device 10 from one another.

As is illustrated schematically in FIG. 2, personalized printed products 32 can be fed in stacks to a feeder 25 that is designed to remove in each case a personalized printed product 213 from the stack and to feed it to the conveying device 10.

The conveying device can have an outgoing section, at which the feeders 21, 22, 23, 24, 25 are arranged, and a return section, on which the relevant products are conveyed in the opposite direction to the outgoing section. This makes it possible to provide an optional feedback 40 in order, in the event of a fault, to feed the relevant product to the outgoing section again and to complete it. A correctly compiled printed end product 11 is highlighted on the return section in FIG. 2. Said printed end product is provided for direct forwarding to the further processing devices 50, 60 described below. An erroneously compiled printed end product 12 is highlighted on the return section in FIG. 2. Said printed end product is provided for forwarding to the feedback 40 in order to carry out a repair.

In one variant, a faulty product is simply removed, for example by being taken away or jettisoned at a specific location of the conveying device 10.

As illustrated schematically in FIG. 2, the conveying device 10 is adjoined by one or a plurality of further processing devices 50, 60. The further processing devices 50, 60 can be designed for adhesively bonding printed products, for wrapping printed products, for inserting printed products into envelopes, etc. As illustrated schematically in FIG. 2, the personalized printed product 32 can concern a personalized envelope which is fed to an inserting apparatus 60 in order to insert printed products into the personalized envelope and to form a personalized printed end product.

As illustrated schematically in FIG. 2, the further processing devices 50, 60 are adjoined by one or a plurality of packaging devices 71, 72 in order to combine the personalized printed end products in packs 81, 82, . . . , 8$n$ and to feed them for delivery.

The described production of personalized printed end products enables cost-effective production of large runs with personalized printed end products. The personalized printed end products can be coordinated very precisely with the recipient of the personalized printed end product. In this regard, by way of example, for a recipient who likes to play golf in fair weather and likes to go fishing in poor weather, the daily newspaper can be furnished with the brochures about fishing and about playing golf which are applicable to a relevant month. In addition, the personalized printed end product can be provided either with up-to-date information about playing golf or with up-to-date information about fishing in accordance with the up-to-date weather forecast by a personalized printed product being produced in a manner updated daily.

I claim:

1. An automated method for producing personalized printed end products which include a printed product collection and at least one personalized printed product, comprising:
    a control system automatically creating end product specifications which define a plurality of personalized printed end products;
    the control system automatically creating sales orders on the basis of the end product specifications, wherein a sales order defines a production sequence for the plurality of personalized printed end products to optimize an occupancy of feed devices of a production apparatus for producing the personalized printed end products;
    the control system automatically initiating the process of creating and creating digital print orders for the production apparatus on the basis of the end product specifications and the sales orders, wherein a digital print order defines at least one personalized printed product;
    producing printed product collections with the production apparatus in accordance with the sales orders;
    producing personalized printed products with a digital printing machine in accordance with the digital print orders; and
    producing the plurality of personalized printed end products by combining each of the personalized printed products with one of the produced printed product collections.

2. The method according to claim 1, wherein the process of producing personalized printed products is initiated temporally before the process of producing the printed product collections.

3. The method according to claim 1, wherein produced personalized printed products are temporarily stored in an intermediate store.

4. The method according to claim 1, wherein, during the process of producing printed product collections, fault monitoring is performed and faulty printed product collections are repaired or discarded and produced subsequently.

5. The method according to claim 4, wherein an associated personalized printed product is produced subsequently with respect to a repaired or subsequently produced printed product collection.

6. The method according to claim 1, wherein, during the process of producing a personalized printed end product, quality control is performed and an associated quality identification is attached to the personalized printed end product.

7. The method according to claim 1, wherein a check code is assigned to the personalized printed end product, said check code being attached to the personalized printed end product.

8. The method according to claim 1, wherein at least one end product specification is provided in the form of an XML document.

9. The method according to claim 1, wherein at least one end product specification is provided in the form of a URL.

10. The method according to claim 1, wherein the personalized printed end products include access data that enables each addressee assigned to the personalized printed end products to communicate with the control system via a data processor of the addressee to change the process of creating an updated end product specification for the addressee.

11. The method according to claim 10, wherein the access data comprises an optically readable QR code or URL.

12. The method according to claim 1, wherein a personalized printed end product is produced in such a way that it comprises a jacket product which jackets the printed product collection and the personalized printed product.

13. The method according to claim 1, wherein a personalized printed end product is produced in such a way that the personalized printed product is a cover which encloses the printed product collection.

14. The method according to claim 1, wherein a personalized printed end product is produced in such a way that the personalized printed end product has a printed product collection and a personalized printed product which are adhesively bonded to one another, wherein the adhesive bonding is releasable preferably without damage to the products.

15. The method according to claim 1, wherein the each of the personalized printed products is combined with the one of the produced printed product collections on a conveying device of the production apparatus.

16. The method according to claim 1, further comprising optimizing the production sequence of the sales order according to delivery routes, and arranging the personalized printed end products in packs as a function of the delivery routes.

17. The method according to claim 1, further comprising feeding the personalized printed products from the digital printing machine to the produced printed product collections via a feeder of the production apparatus.

18. A production apparatus for producing personalized printed end products, comprising:
    a control center including a computer-readable storage medium encoded with instructions executable via a data processor, the encoded instructions comprising:
        instructions for automatically creating end product specifications which define in each case at least one personalized printed end product,
        instructions for automatically creating sales orders on a basis of the end product specifications, wherein a sales order defines a production sequence for the plurality of personalized printed end products to optimize an occupancy of feed devices of a production apparatus for producing the personalized printed end products, and
        instructions for automatically initiating the process of creating and creating digital print orders on the basis of end product specifications and sales orders, wherein a digital print order defines at least one personalized printed product;
    a conveying device with a plurality of feeders; and
    a digital printing machine;
    wherein the control center automatically controls the conveying device and the digital printing machine and the encoded instructions further comprise:
        instructions for producing, using the conveying device and the plurality of feeders, printed product collections in accordance with the sales orders,
        instructions for producing, using the digital printing machine, personalized printed products in accordance with the digital print orders, and
        instructions for producing personalized printed end products by automatically combining the personalized printed products with the produced printed product collections.

19. The production apparatus according to claim 18, further comprising an inserting apparatus in combination with the conveying device and producing, using the conveying device or the inserting apparatus, the personalized printed end products.

20. The production apparatus according to claim 19, wherein the personalized printed products comprise a personalized envelope and, wherein the inserting device inserts one of the produced printed product collections into the personalized envelope.

\* \* \* \* \*